United States Patent [19]

Ahl

[11] Patent Number: 5,308,933
[45] Date of Patent: May 3, 1994

[54] TRUCK SCALE

[75] Inventor: Nils G. Ahl, Vasteras, Sweden

[73] Assignee: Flintab AB, Vasteras, Sweden

[21] Appl. No.: 832,368

[22] Filed: Feb. 7, 1992

[51] Int. Cl.$^5$ .......................................... G01G 19/02
[52] U.S. Cl. .................................... 177/135; 177/199
[58] Field of Search .............. 177/134, 135, 161, 199, 177/163

[56] References Cited

U.S. PATENT DOCUMENTS

| | | | |
|---|---|---|---|
| 2,264,909 | 12/1941 | Kelly | 177/161 |
| 3,442,343 | 5/1969 | Marion | 177/134 |
| 3,746,111 | 7/1973 | Berthiaume et al. | 177/163 |

Primary Examiner—George H. Miller, Jr.

[57] ABSTRACT

A truck scale has a weighbridge built with two parallel beams for carrying the wheels of a truck. The beams are laterally interconnected, and are each narrower than half the width of the weighbridge, so there is a gap at the center between the beams. Each beam rests directly on load cell devices supported by foundation members. In very long scales each beam is composed of shorter sections, each supported by a pair of load cell devices. The gap in the center of the weighbridge is covered by removable cover plates or blocks, which may have side walls extending above the beams to limit the lateral travel of truck wheels on the scale.

15 Claims, 5 Drawing Sheets

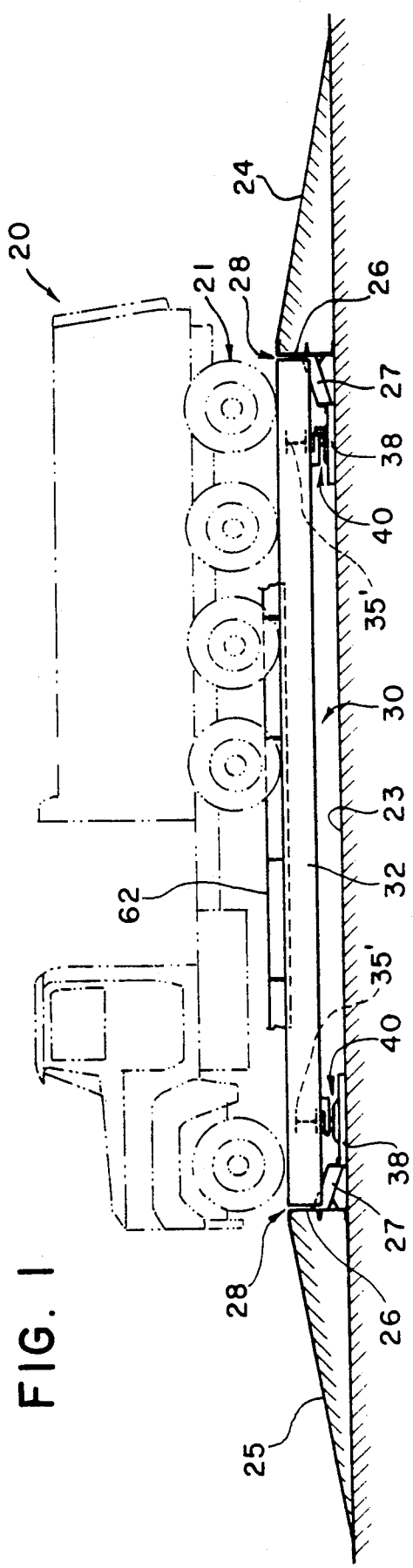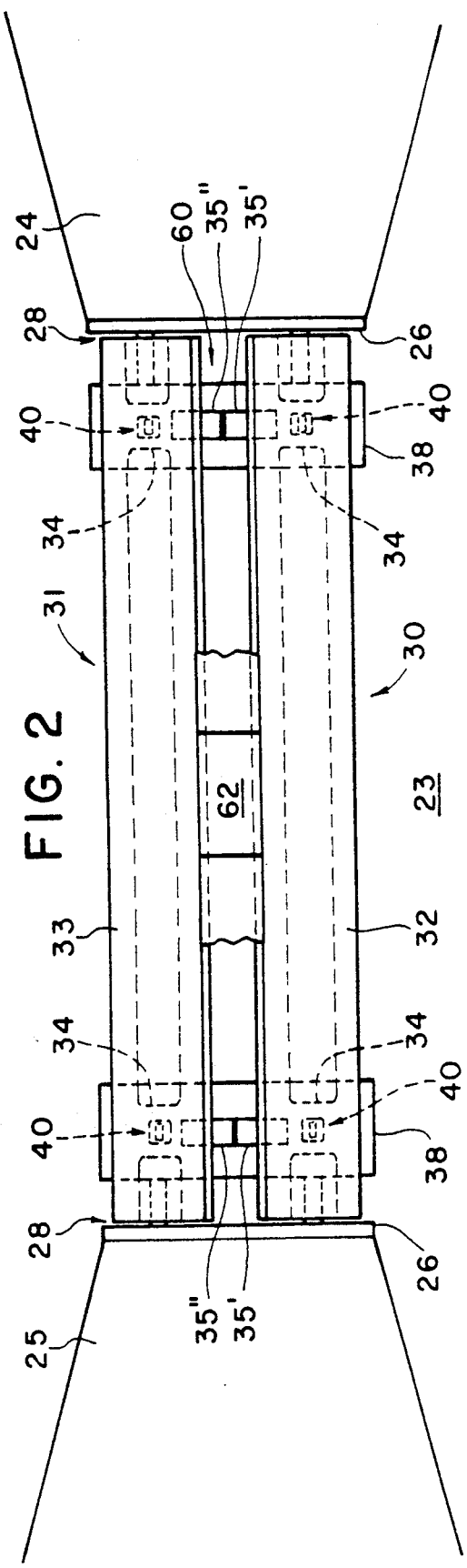

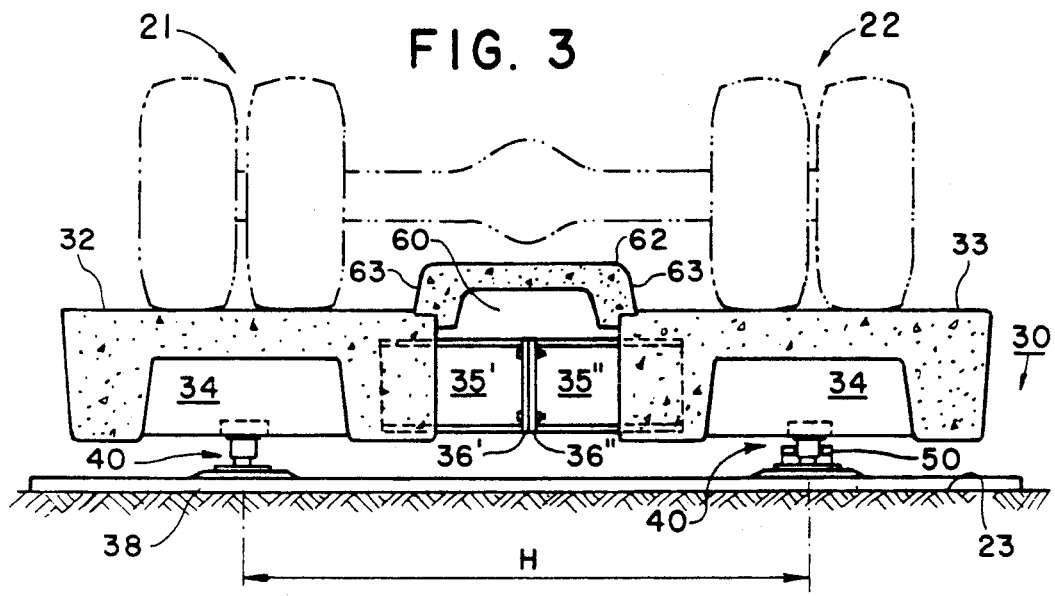
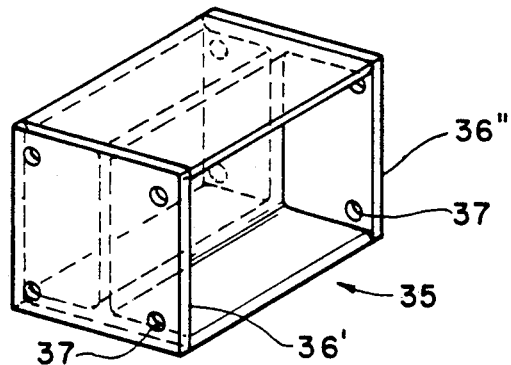
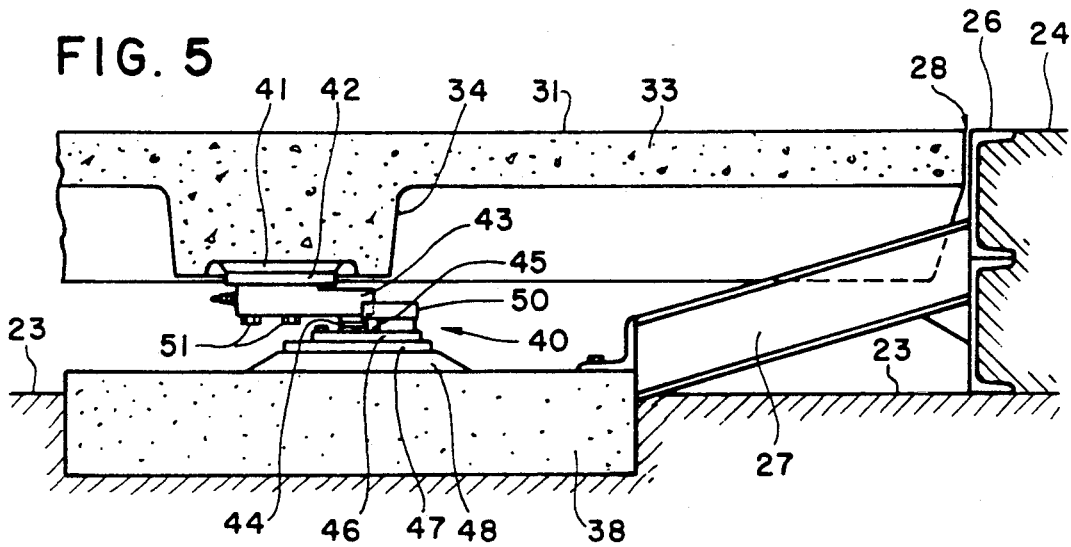

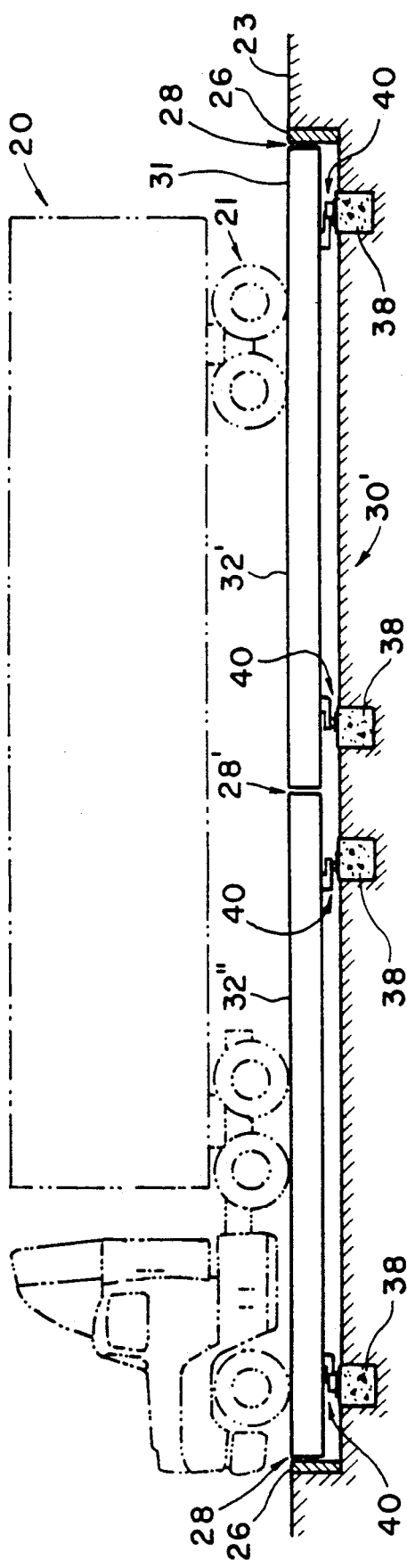
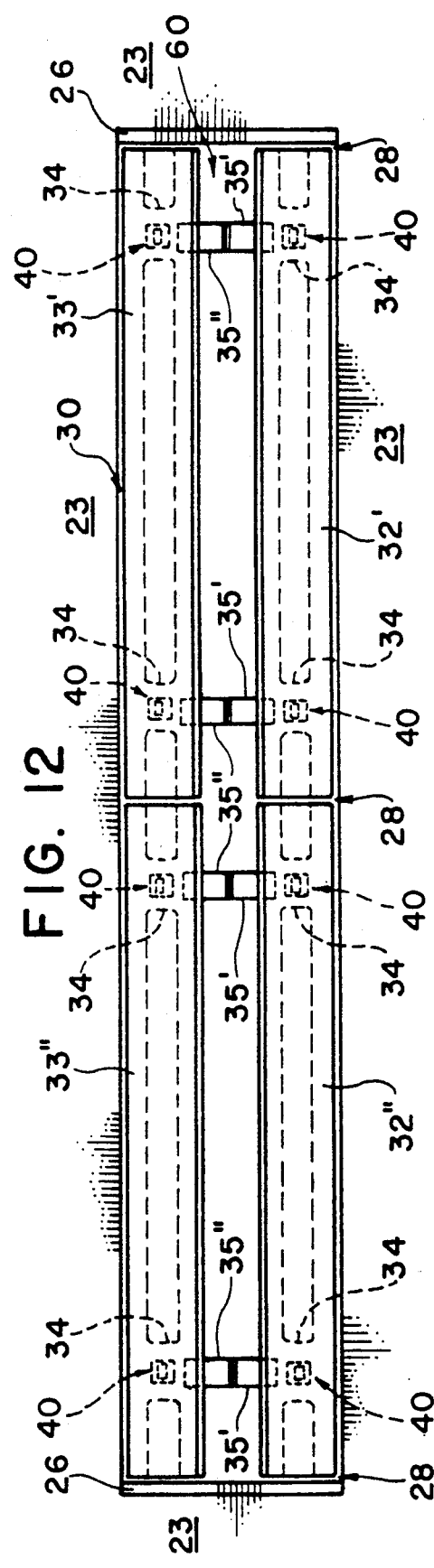

TRUCK SCALE

BACKGROUND OF THE INVENTION

The invention relates to electronic scales for weighing of heavy duty trucks, and specifically to scales with a new and improved weighbridge design, and to a new and improved method for constructing truck scales.

Heavy duty truck scales are well known in the art; numerous designs are available on the market. Current truck scales use a weighbridge, which is supported on a plurality of load cells. The width of the weighbridge must be about 10' (3 m) for regular over-the-road trucks, and the length of the weighbridge must be about 30' (9 m) for simple trucks, such as dump trucks, and nearly 100' (30 m) for the longest tractor trailer rigs.

The large size of a weighbridge for truck scales makes it difficult to transport them from a manufacturing shop to the site of a scale installation, so many designs have been developed to minimize the transportation problem.

One solution involves assembling a large steel weighbridge on site, more or less from scratch. An alternative is to pour a large concrete weighbridge on site. These types of weighbridges are very time consuming and expensive to build, and they generally can not be moved to a different location later on.

Another solution is to assemble the deck from a number of wide, but short and relatively light steel modules, each supported on four load cells, for instance as disclosed in U.S. Pat. No. 4,266,624. The cost for a scale based on this design is high, both because a large number of load cells are required, and because the modules are made of steel.

A third solution involves the use of two beams placed side by side on cross-beams, which in turn are supported by load cells, for instance as described in U.S. Pat. Nos. 3,770,068 and 4,887,678. This design can be used with concrete beams, and has had enjoyed considerable success, but the cross beams add to the cost and complexity of a scale installation.

SUMMARY OF THE INVENTION

An object of the present invention is to provide a truck scale that is easily transportable from the manufacturing location to the site of a scale installation.

A second object of the invention is to provide a truck scale using an inexpensive pre-fabricated concrete weighbridge that is easily transportable from a manufacturing location to the site of a scale installation.

Another object of the invention is to provide a simple and low cost method for installing a truck scale.

A further object of the invention is to provide a truck scale that can easily be moved between different locations.

Additional objects and advantages of the invention will be set forth in the description which follows, and will be obvious from the description, or may be learned by practice of the invention.

The objects of the invention are obtained by a truck scale that comprises a pair of narrow beams, interconnecting means for spacing said narrow beams apart to form a weighbridge with a gap in the middle, a plurality of load cell devices arranged to directly support each narrow beam, and foundation means for supporting said load cell devices.

BRIEF DESCRIPTION OF THE DRAWINGS

The accompanying drawings, which are incorporated in and constitute a part of the specification, illustrate preferred embodiments of the invention and, together with the description, serve to explain the principles of the invention.

FIG. 1 is a side view of a scale according to the invention arranged above ground, with a truck in weighing position on the scale.

FIG. 2 is a top view of the scale shown in FIG. 1.

FIG. 3 is an enlarged vertical sectional view of the scale shown in FIG. 1 with a truck laterally centered on the weighbridge.

FIG. 4 is a perspective view of a lateral interconnection device for the two longitudinal beams forming the weighbridge of the scale shown in FIGS. 1-3.

FIG. 5 is a partial side view of the scale shown in FIGS. 1-3 illustrating details of a preferred load cell device.

FIG. 11 is a side view of a scale according to the invention with a long weighbridge arranged in a scale pit, with a tractor trailer rig in weighing position on the weighbridge.

FIG. 12 is a top view of the scale shown in FIG. 11.

DETAILED DESCRIPTION OF A PREFERRED EMBODIMENT

Figure 6:
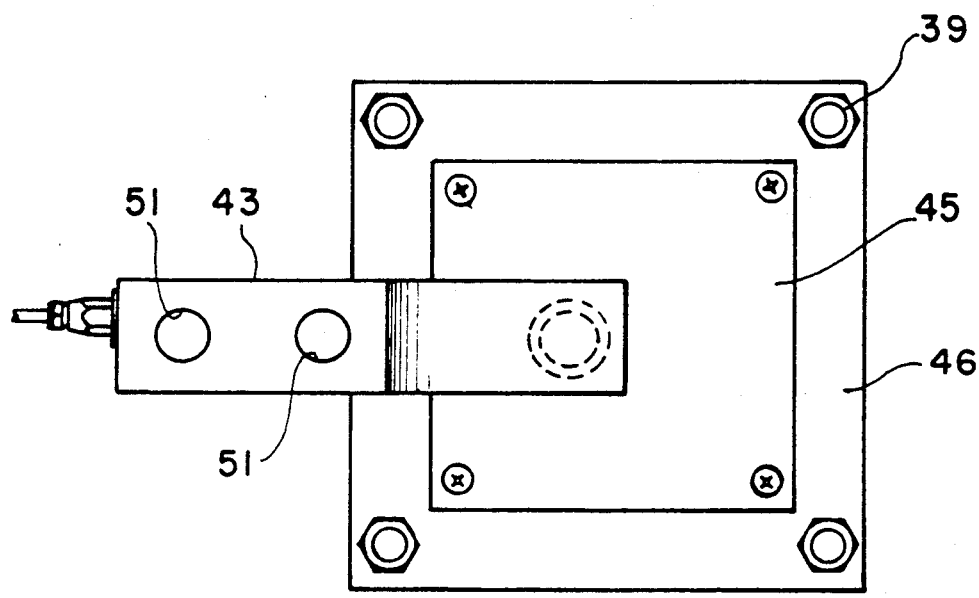
FIG. 6 is a top view of a free sliding bottom loading plate in a load cell device as shown in FIG. 5.

Reference will now be made in detail to a preferred embodiment of the invention as shown in the accompanying drawings.

A truck scale 30 according to the invention is shown in side view in FIG. 1, in top view in FIG. 2, and in vertical section in FIG. 3.

The scale as shown is installed above ground 23, for instance in a gravel pit area. A ramp 24 of packed dirt allows a dump truck 20 to enter the scale 30 for weighing, and a second ramp 25 provides exit for the truck 20 from the scale 30 after weighing is completed. The scale 30 comprises a weighbridge 31, which is supported on foundation members 38 via four load cell devices 40, as is common in the art.

According to the invention, the weighbridge 31 comprises two parallel load bearing beams 32, 33, each of which is supported directly by a pair of load cell devices 40, which in turn rest on the foundation members 38. Each of the beams 32, 33 could be formed with a T cross section or with a channel cross section. As shown, each of the two beams 32, 33 has a channel cross section with a flat top and open below. The beams 32, 33 are made of reinforced concrete, and two support pads 34 of reinforced concrete with bolts (not shown) for the load cell devices 40 are formed on the underside of each beam 32, 33 between the side walls of the channel (FIG. 5 shows details).

The two beams 32, 33 are laterally interconnected (35) to maintain a fixed distance H between the centers of the two beams 32, 33 substantially equal to the lateral distance between wheel units 21, 22 on a standard truck 20. The lateral interconnections (35) also prevent the beams 32, 33 from twisting about the load cell devices 40, which are substantially centered under the beams 32, 33.

The lateral interconnection (35) of the two beams 32, 33 can be made by two pairs of short I-beams or box-beams 35′, 35″, which are cast into the concrete beams 32, 33, as shown in FIGS. 1-3. Each pair of beams 35″, 35″ is bolted together, for instance via end plates 36′, 36″. Alternatively, the interconnections can be made by means of short boxes 35 as shown in FIG. 4, made from I-beams or box-beams with end plates 36′, 36″. Each pair of beams 32, 33 are joined by means of a pair of boxes 35 bolted between the beams 32, 33 through holes 37 in the endplates 36′, 36″, either by bolts into threaded inserts (not shown) cast into the sides of the concrete beams 32, 33, or onto threaded bolts (not shown) projecting from the sides of the beams 32, 33.

The load cell devices 40 can be almost any type presently on the market. As an example, a load cell device 40 based on a shear beam load cell is shown in elevation in FIG. 5. Shear beam load cells have been found to be especially suitable for heavy duty truck scales.

As illustrated in FIG. 5, each load cell device 40 comprises a loading plate 42, a shear beam load cell 43, a loading button 44, a mounting plate 46 with a stainless steel sliding pad 45 for the loading button 44, and a foundation plate 47.

The loading plate 42 is mounted on bolts (not shown) cast in a support pad 34 in beam 32 (33). The vertical position of the loading plate 42 is adjusted by nuts above and below the mounting plate 42 till it is parallel with and at a predetermined distance from the top of the beam 32 (33). Mortar or grout 41 is then poured between the plate 42 and the loading pad 34 in order to stiffen the plate 42 and lock it in position. Alternatively, the loading plate 42 can be cast in place during the manufacturing of the concrete beams 32, 33.

The foundation plate 47 is similarly mounted on a foundation member 38.

The shear beam load cell 43 is bolted to the loading plate 42 with tight fitting bolts 51, which are prestressed to avoid creep between the load cell 43 and the loading plate 42. The mounting plate 46 with stainless steel sliding pad 45 is bolted or welded to the foundation plate 47.

A loading button 44 is inserted between the load cell 43 and the sliding plate 45. The loading button 44 fits with a spherical loading end in a blind load application hole in the load cell 43, so the load acts near the neutral axis of the bending beam section of the load cell 43. The free end of the loading button 44 is flat and rests on the sliding plate 45. The flat free end of the loading button 44 is usually fitted with a plate (too thin to show in FIG. 5) of porous bronze impregnated with teflon and other lubricants.

The load cell devices 40 can also be installed upside-down relative to the arrangement shown in FIG. 5, i.e. with the load cell 43 bolted to the foundation plate 47, and the mounting plate 46 mounted on the loading plate 42. The arrangement shown in FIG. 5 is usually preferred, however, because the beams 32, 33 often provide better references for alignment of the load cells 43 than the foundation members 38 do.

Figure 7:
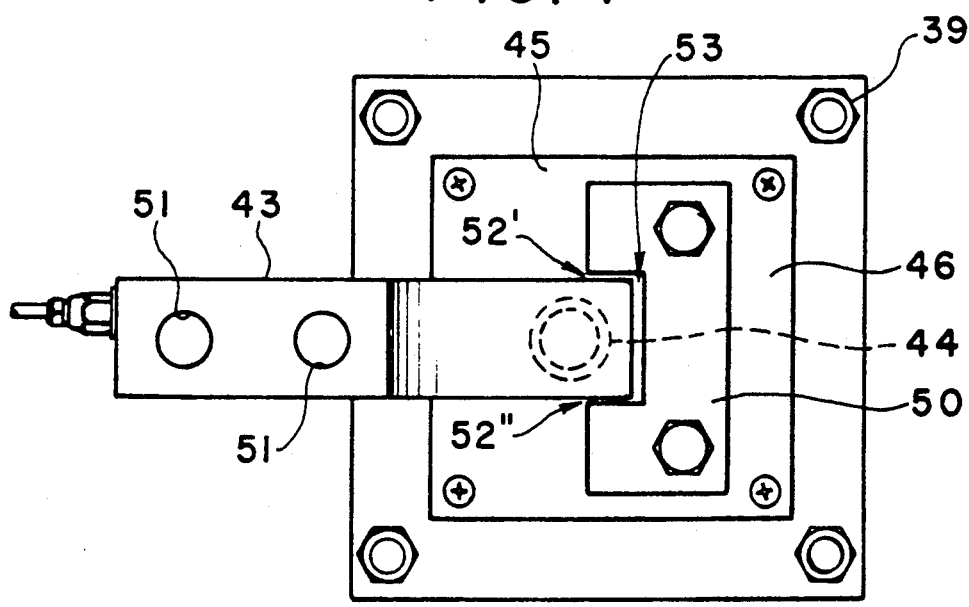
FIG. 7 is a top view of a bottom loading plate with bumpers in a load cell device as shown in FIG. 5.

The load cell devices 40 under one beam 33 include bumpers 50 acting horizontally against the free ends of load cells 43 as shown in FIG. 7. The bumpers 50 are horseshoe shaped steel plates welded to the mounting plates 46 via spacer blocks of steel. The bumpers 50 are positioned to provide narrow gaps 52′, 52″ for the load cell 43 in the lateral direction, and a gap 53 about $\frac{1}{8}″-\frac{1}{4}″$ (3-6 mm) wide in the longitudinal direction of the beam 33. The lateral gaps 52′, 52″ keep the load cell 43, and thereby the beam 33, accurately positioned laterally. The longitudinal gap 53 allows thermal expansion and contraction of the beam 33 relative to the foundation member 38, but limits the longitudinal position of the beam 33 to a narrow range. Vertical friction forces occurring between the load cell 43 and the bumper 50 act directly in parallel with the load application button 44 of the load cell 43, so they do not cause any force shunting past the load cell 43.

The position of the second beam 32 is fixed relative to the first beam 33 by the lateral interconnections 35 between the beams 32, 33. The load cell devices 40 under this second beam 32 are free sliding in all directions, as shown in FIG. 6, so there can never be any binding stresses between the load cell devices 40 of the two beams 32, 33 caused by thermal dilation or sagging of beams 32, 33.

The ramps 24, 25 are built with end walls 26 to hold the ramps 24, 25 from touching the scale 30. The end walls are cast as extensions of the foundation members 38, as shown in FIGS. 1 and 5, so the distance from the bumpers 50 to the end walls 26 is fixed. The bumpers 50 can thus maintain a narrow gap 28 between each end wall 26 and the corresponding end of beam 32 and 33. A narrow gap 28 does not affect the entry or exit of trucks 20, but ensures that there is no force shunting between the weighbridge 31 and ground 23. A suitable width for each gap 28 is $\frac{3}{4}″$ (20 mm).

Each of the beams 32, 33 in a truck scale according to the invention need not be half as wide as the total width W of the weighbridge 31. It is sufficient that each beam 32, 33 is wide enough to accommodate one lateral wheel unit 21, 22 of a truck 20, including uncertainty in the lateral positioning of the truck 20 on the weighbridge 31. It is customary to make a weighbridge 31 for a truck scale 10′ (3 m) wide, and trucks typically have a center distance H between right and left wheel units (21, 22) of about 6′ (1.8 m). This means that if each beam 32, 33 has a width equal to $W-H=4′$ (1.2 m), the center lines of beams 32, 33 will be positioned under the wheel centers of a truck 20 centered on the weighbridge 31. The load cell devices 40 are located directly below, or slightly outside, the center lines of the beams 32, 33, so there will be no significant twisting moments on the beams 32, 33 from the wheel loads in this case.

When two beams 32, 33 of 4′ (1.2 m) width are located with outside edges 10′ (3 m) apart, there will be a 2′ (0.6 m) gap 60 between the beams 32, 33. This gap 60 must be covered to avoid injury to persons that happen to walk on the weighbridge 31. It is advantageous to provide easy access to the lower parts of the truck scale 30, so the gap 60 covering should preferably be easily removable. This can be achieved by a gap 60 covering comprising short pieces of grate 67 or short concrete blocks 62.

For accurate weighing, the truck wheels 21, 22 must be supported solely by the weighbridge 31. If part of the wheels 21, 22 touch ground outside the weighbridge 31, there will be force shunting that reduces the weight reading. In a truck scale 30 arranged above ground, as illustrated in FIGS. 1-3, the truck wheel units 21, 22 must also remain laterally inside the weighbridge 31 for safety reasons. Different methods for ensuring that the wheel units 21, 22 remain on the weighbridge 31 at all times are illustrated in FIGS. 8-10.

Figure 8:
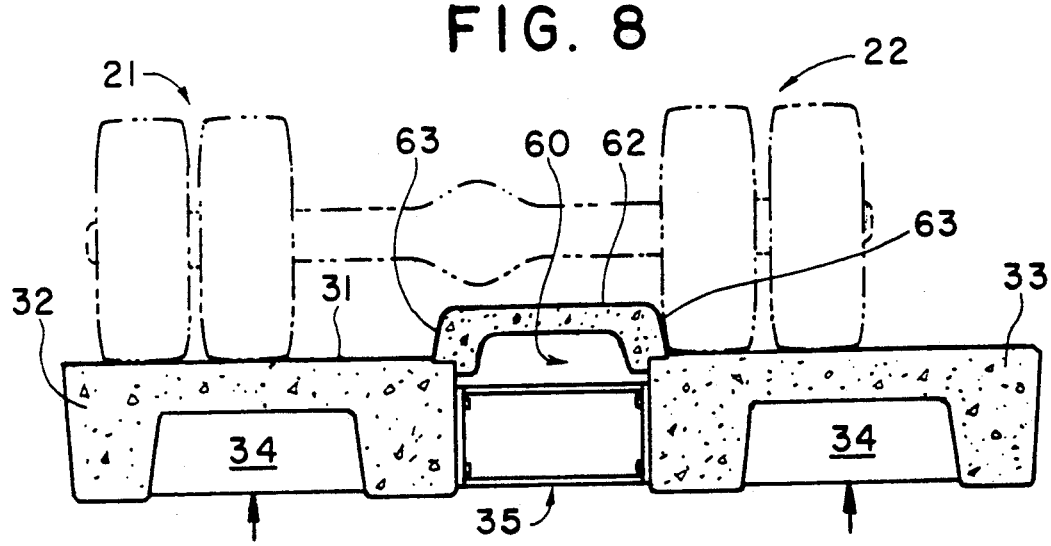
FIG. 8 is an enlarged vertical sectional view of the scale shown in FIGS. 1-3 with one type of truck laterally off center on the weighbridge.
Figure 9:
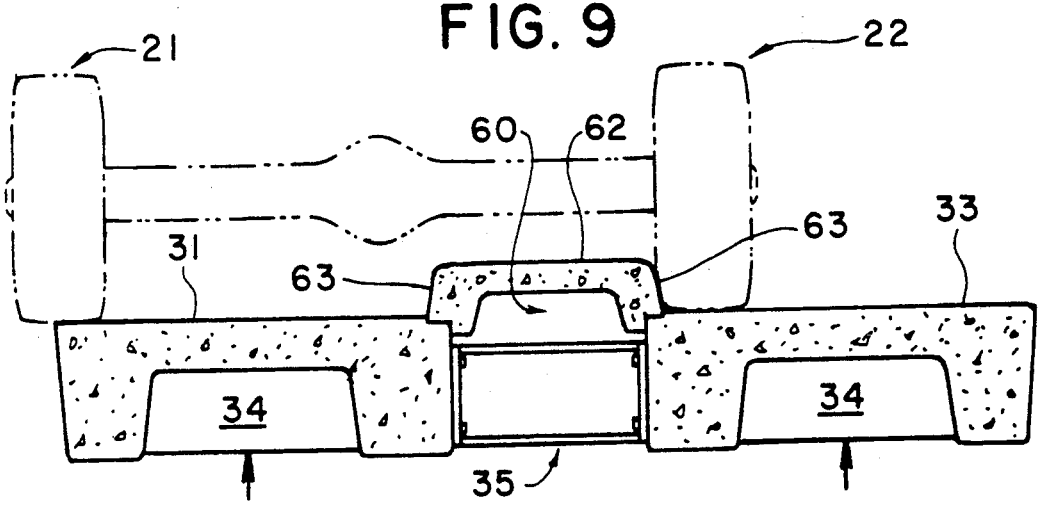
FIG. 9 is an enlarged vertical sectional view of the scale shown in FIGS. 1-3 with another type of truck laterally off center on the weighbridge.

FIG. 8 shows a truck 20 having wheel units 21, 22 with dual wheels, and FIG. 9 shows a truck having single-wheel units 23, 24. FIGS. 8 and 9 both show the gap 60 covered by concrete blocks 62 that have side edges 63 extending above the top surface of beams 32, 33. The side edges 63 will guide both single-wheel and dual-wheel wheel units 21, 22 laterally so they always remain on the weighbridge 31, which is sufficient for safety reasons on an above-ground scale as shown in FIGS. 1-3.

If, however, a truck 20 having wheel units 21, 22 with single wheels as shown in FIG. 9, entered a scale 30 arranged flush with the ground 23, one wheel could extend partially outside the edge of the weighbridge 31 and cause force shunting to ground 23. This problem can be avoided by using beams 32, 33 with barriers 65 added at their outside edges, as shown in FIG. 10, to limit lateral travel of wheel units 21, 22. This barrier arrangement assures that the truck wheels 21, 22 cannot touch ground 23 outside the weighbridge 31, so risk of force shunting is eliminated. The barriers 65 may be combined with concrete blocks 62 with guiding edges 63 as shown in FIGS. 8-9, but flat grates 67 are sufficient as cover plates for the gap 60 in this case.

Figure 10:
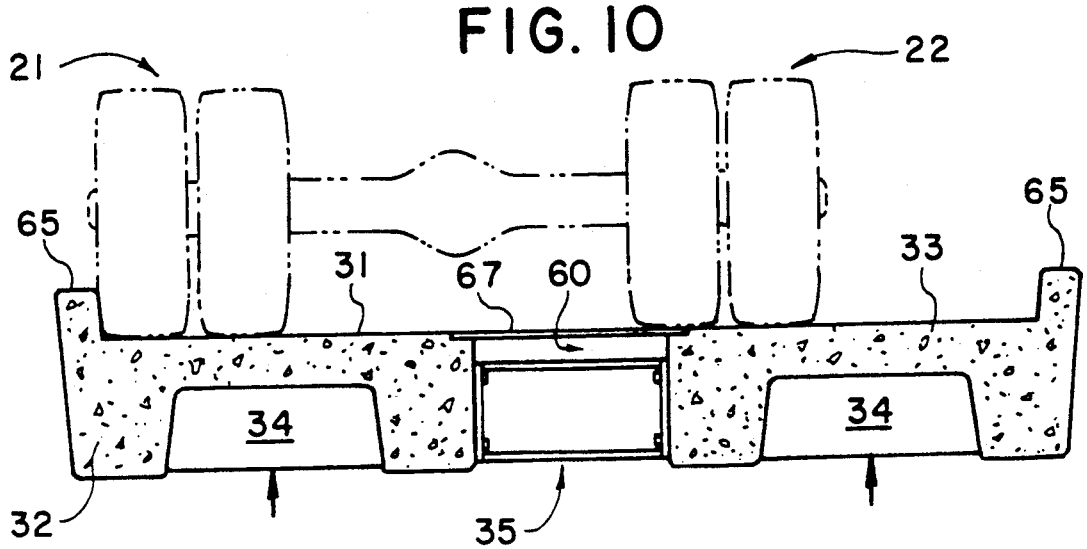
FIG. 10 is an enlarged vertical sectional view of a scale as shown in FIGS. 1-3 having a modified beam profile with a truck laterally off center on the weighbridge.

When a truck 20 is positioned off center on the weighbridge 31, as shown in FIGS. 8-10, the wheel loads act outside vertical planes through the load cell devices 40 that support the beams 32, 33, so twisting moments will act on the beams 32, 33. The twisting moments are, however, absorbed by the bending stiffness of the interconnections 35 between the two beams 32, 33, so the net effect is that the vertical load on one beam (33 in FIGS. 8-10) is reduced while the vertical load on the other beam (32) is increased. The maximum value of the twisting moments is limited by the maximum lateral movement of the wheel units 21, 22 allowed by center edges 63 or outer barriers 65, so the interconnections 35 can be designed without any uncertainty regarding required bending stiffness.

In cases where very long weighbridges 31 are required, each beam 32, 33 may be supported by more than two load cell devices 40, for instance one at each end and one in the middle of each beam 32, 33. For ease of transportation, however, it is better to split each beam 32, 33 in two or more shorter sections. The sections of beams 32, 33 may be hinged together and supported by load cells 40 at the hinge points and at the free ends of the beams 32, 33, or the sections can be separately supported by load cell devices as will be described next.

FIGS. 11 and 12 illustrate a preferred form of a scale 30' according to the invention for very long tractor trailer rigs 20'. The scale 30' is illustrated as a permanent scale installation in a scale pit, with the top of the weighbridge 31 at ground 23 level. The scale pit is limited by end walls 26 and side walls 27 of concrete. The scale 30' is built with parallel narrow beams 32, 33 as described above, but each beam 32 and 33 is split into shorter beam sections 32', 32" and 33', 33" for ease of transportation. Each beam section 32', 32", 33', and 33" is separately supported near their ends by load cell devices 40, and each pair of parallel beam sections 32', 33' and 32", 33" are interconnected laterally, as described above with reference to FIGS. 1-5. Narrow gaps 28 to the end walls 26, and narrow gaps 28' between the adjoining ends of different beam sections 32', 32" and 33', 33", are maintained by bumpers 50 in the load cell devices 40, as described above with reference to FIGS. 1-5.

A truck scale 30 according to the invention is installed as follows:

First, foundation members 38 for the scale are arranged at the proper locations under the scale. The foundation members 38 with end walls 26 may be prefabricated concrete structures, or they may be cast-on-site concrete structures, placed on the ground 23 in an above-ground scale, as shown in FIGS. 1-4. They can also be separate concrete plinths 38 cast in the bottom of a prepared weighing pit for a permanent flush type scale installation as shown in FIGS. 11-12.

Second, the foundation plates 47 for all the load cell devices 40 are mounted on the foundation members 38 as described earlier with reference to FIG. 5, and mounting plates 46 with slide plates 45 are bolted or welded in place on the foundation plates 47.

Third, the upper parts 42-43 of the load cell devices 40 are mounted underneath the beams 32, 33, as described with reference to FIG. 5, unless they were already premounted at the scale factory.

Fourth, a pair of beams 32, 33, or beam sections 32', 33' (32", 33"), with the upper parts 42-43 of the load cell devices 40 mounted and with loading buttons 44 in place, are placed side by side at correct spacing 60, with the loading buttons 44 resting on the sliding plates 45. Blocks resting on the foundation members 38 are used as temporary supports to keep the beams 32, 33 from tilting on the load cell devices 40.

Fifth, the beams 32, 33, or beam sections 32', 33' (32", 33"), are bolted firmly together by means of the interconnecting parts 35 (35', 35"), and the weighbridge 31 is aligned longitudinally and laterally relative to the end walls 26 and side walls 27. The load buttons 44 and slide plates 45 allow the beams 32, 33 or beam sections 32', 33' (32", 33") to slide horizontally during the interconnection of the beams and the adjustment of their location.

Sixth, bumpers 50 are placed on the mounting plates 46 for the load cell devices 40 supporting one of the beams (33). The bumpers 50 are aligned for proper spacings 52', 52", 53 around the end of each of the load cells 43, and are then welded in place on their mounting plates 46. No bumpers 50 are used under the second beam (32).

Finally, the load cells 43 are wired to a scale instrument (not shown), the gap 60 between the beams 32, 33 are covered by concrete blocks 62 or grates 67, ramps 24, 25 are prepared for an above ground scale, and the scale is ready for on site calibration and certification.

The largest building block of a truck scale 30 is the weighbridge 31. In a scale according to the invention, however, can be transported as two separate beams 32, 33. The width of each beam 32, 33 is only about 4' (1.2 m) if separate interconnection pieces 35 are used, or about 5' (1.5 m) if the interconnection parts 35', 35" are cast into the beams. The beams 32, 33 also need not be excessively long, because the scale can be built in separate sections as described above with reference to FIGS. 11-12. The beams 32, 33 can accordingly be carried on ordinary trucks without any concern about the load being too wide or too high or too long, and the weight will not be excessive even when relatively inexpensive concrete beams are used.

Transportation and installation of a truck scale according to the invention is so simple and inexpensive, that it is feasible to move the scale from place to place, as need for weighing changes. This is a great advantage in gravel pits and similar installations where it may become necessary to move truck access roads from time to time. A scale according to the invention will, however, in spite of its simplicity meet the strictest accuracy requirements, so it is equally suitable for permanent scale installations, where its only advantage is lower cost.

It will be evident to those skilled in the art that a scale according to the invention for very long tractor trailer rigs as illustrated in FIGS. 11-12 is as simple to ship and install as the shorter scale described with reference to FIGS. 1-5, and that there is not limit to the length of scale that can be built according to the invention by simply adding sections as described above.

The invention is not limited to any specific details of the preferred embodiments described above and illustrated in the appended Figures, but only by the claims and equivalents thereof.

I claim:

1. Truck scale for weighing over-the-road vehicles supported by pairs of wheel units, comprising:
    (a) a pair of narrow beams, each narrow beam having a top surface that is wider than one of said wheel units and adapted to directly support a wheel unit;
    (b) interconnecting means for rigidly spacing said narrow beams apart to form a weighbridge with a gap in the middle;
    (c) a plurality of load cell devices arranged to directly support each narrow beam; and
    (d) foundation means for supporting said load cell devices.

2. Truck scale according to claim 1, further comprising cover means for removably closing said gap between the narrow beams.

3. Truck scale according to claim 2, wherein said cover means comprises a number of short blocks with side walls extending above said weighbridge, whereby said side walls limit the lateral position of wheels on a truck entering the truck scale.

4. Truck scale according to claim 1, wherein said beams are provided with lateral barriers arranged to prevent a truck wheel from moving outside said beams.

5. Truck scale according to claim 1, wherein each of said narrow beams comprises a plurality of separate sections arranged end to end, and two load cell devices are arranged to support each separate section of each beam.

6. Truck scale according to claim 1, wherein said foundation means is arranged above ground, and wherein the truck scale further comprises ramp means for allowing a truck to drive up on top of said weighbridge.

7. Truck scale according to claim 1, wherein said narrow beams are made of reinforced concrete.

8. Method for constructing a truck scale for weighing over-the-road vehicles supported by pairs of wheel units, comprising the steps of:
    (a) providing foundation members for the scale;
    (b) providing a pair of narrow beams, each narrow beam having a top surface that is wider than one of said wheel units and adapted to directly support a wheel unit;
    (c) providing load cell devices for supporting each of said narrow beams on the foundation members;
    (d) providing rigid cross braces for interconnecting the pair of narrow beams;
    (e) interconnecting the pair of narrow beams to form a weighbridge with a gap along its centerline; and
    (f) mounting the pair of narrow beams on said foundation members directly via the load cell devices.

9. Method for constructing a truck scale according to claim 7, further comprising the steps of providing a plurality of short cover pieces adapted to fit removably over the gap along the center of the weighbridge, and covering the gap with the cover pieces.

10. Method for constructing a truck scale according to claim 9, wherein the cover pieces are short blocks with side walls extending above the top of the weighbridge, whereby the side edges limit lateral movement of wheels on a truck to be weighed.

11. Method for constructing a truck scale according to claim 9, wherein said narrow beams are provided with lateral barriers for limiting lateral movement of wheels on a truck to be weighed.

12. Method for constructing a truck scale according to claim 7, wherein each of the narrow beams includes a plurality of separate sections arranged end to end, and the method further comprises the step of providing one pair of load cell devices for supporting each separate section of the narrow beam.

13. Method for constructing a truck scale according to claim 8, wherein said narrow beams are made of reinforced concrete.

14. Truck scale, comprising:
    (a) a pair of narrow beams;
    (b) interconnecting means for rigidly spacing said narrow beams apart to form a weighbridge with a gap in the middle;
    (c) a plurality of load cell devices arranged to directly support each narrow beam;
    (d) foundation means for supporting said load cell devices; and
    (e) cover means for removably closing said gap between the narrow beams.

15. Truck scale according to claim 14, wherein said cover means comprises a number of short blocks with side walls extending above said weighbridge, whereby said side walls limit the lateral position of wheels on a truck entering the truck scale.

* * * * *